(12) United States Patent
Baik et al.

(10) Patent No.: US 9,063,389 B2
(45) Date of Patent: Jun. 23, 2015

(54) CAMERA MODULE

(71) Applicant: SAMSUNG ELECTRO-MECHANICS CO., LTD., Suwon (KR)

(72) Inventors: Jae Ho Baik, Suwon (KR); Jung Seok Lee, Suwon (KR); Myung Ki Lee, Suwon (KR); Jae Hyuk Lee, Suwon (KR); Po Chul Kim, Suwon (KR); Woon Ki Kim, Suwon (KR); Chuel Jin Park, Suwon (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 14/083,440

(22) Filed: Nov. 18, 2013

(65) Prior Publication Data
US 2015/0015770 A1  Jan. 15, 2015

(30) Foreign Application Priority Data
Jul. 9, 2013  (KR) .................... 10-2013-0080290

(51) Int. Cl.
*H04N 5/225* (2006.01)
*G03B 3/10* (2006.01)

(52) U.S. Cl.
CPC ............... *G03B 3/10* (2013.01); *H04N 5/2254* (2013.01)

(58) Field of Classification Search
CPC ................... H04N 5/2253; H04N 5/2254
USPC ............. 250/208.1, 239; 257/432–434, 680; 348/294, 335, 340, 373, 374; 359/811, 359/819, 823, 824; 396/55, 133, 144, 529, 396/535
See application file for complete search history.

(56) References Cited

U.S. PATENT DOCUMENTS

| 2006/0103953 | A1* | 5/2006 | Lee et al. ................ 359/819 |
| 2006/0222300 | A1* | 10/2006 | Frenzel et al. ............. 385/88 |
| 2008/0152339 | A1* | 6/2008 | Westerweck et al. ...... 396/541 |
| 2008/0159734 | A1* | 7/2008 | Westerweck et al. ...... 396/541 |
| 2009/0295983 | A1* | 12/2009 | Sekimoto et al. ......... 348/362 |

FOREIGN PATENT DOCUMENTS

| KR | 10-2012-0042517 A | 5/2012 |
| KR | 10-2012-0067104 A | 6/2012 |

* cited by examiner

*Primary Examiner* — Timothy J Henn
(74) *Attorney, Agent, or Firm* — Ladas & Parry, LLP

(57) ABSTRACT

There is provided a camera module including: a lens barrel having one or more lenses positioned along an optical axis; and a housing having the lens barrel therein, wherein the housing includes a first through hole into which the lens barrel is inserted and a second through hole having a diameter larger than that of the first through hole.

7 Claims, 5 Drawing Sheets

CAMERA MODULE

CROSS-REFERENCE TO RELATED APPLICATIONS

This application claims the benefit of Korean Patent Application No. 10-2013-0080290 filed on Jul. 9, 2013, with the Korean Intellectual Property Office, the disclosure of which is incorporated in its entirety herein by reference.

BACKGROUND OF THE INVENTION

1. Field of the Invention

The present invention relates to a camera module.

2. Description of the Related Art

In general, it is common for mobile communication terminals such as mobile phones, PDAs and portable PCs to not only transmit text messages or voice data but also image data.

Following this trend, recent mobile communication terminals are standardly equipped with camera modules to capture image data or to perform video chatting.

Typically, a camera module includes a lens barrel having lenses therein, a housing accommodating the lens barrel therein, and an image sensor converting an image of a subject into an electrical signal.

Traditionally, a short-focus type camera module which images an object at a fixed focus has been employed. Recently, as technology has evolved, however, a camera module including an actuator that enables auto-focusing has been employed.

With this auto-focus function, the distance between the lens barrel having lenses therein and the image sensor is adjusted, such that the subject may be clearly imaged on the image sensor.

Accordingly, in order to implement the auto-focus function, the lens barrel should be movable along the optical axis, and a predetermined space is formed between the lens barrel and the housing so as to avoid friction therebetween.

However, if foreign objects are introduced into the space to reach the image sensor, image deterioration, flaring and the like may occur so that the camera module may be adversely influenced.

SUMMARY OF THE INVENTION

An aspect of the present invention provides a camera module capable of preventing, even if foreign objects have been introduced into the camera module, the introduced foreign objects from reaching an image sensor.

According to an aspect of the present invention, there is provided a camera module including: a lens barrel having one or more lenses positioned along an optical axis; and a housing having the lens barrel therein, wherein the housing includes a first through hole into which the lens barrel is inserted and a second through hole having a diameter larger than that of the first through hole.

The first through hole and the second through hole may be connected to each other by a stepped portion, wherein a first collecting groove may be formed in the stepped portion.

The housing may have a fixing groove in its lower inner surface, wherein the fixing groove may have an infrared filter attached thereto.

A window may be formed between the lens barrel and the infrared filter through which light from the lens passes, wherein the window may have a circular plane.

The lens barrel may have, on its outer surface, a protruding portion facing the inner surface of the housing in which the second through hole is formed.

The protruding portion may have a second collecting groove formed in its upper surface.

A diameter of the first through hole may be greater than that of the second though hole at a position in which the protruding portion is formed.

According to another aspect of the present invention, there is provided a camera module including: a lens barrel having one or more lenses positioned along an optical axis; and a housing having the lens barrel therein, wherein at least two step structures are formed between an inner surface of the housing and an outer surface of the lens barrel.

The inner surface of the housing may be stepped, wherein the stepped portion may have a first collecting groove formed therein.

A protruding portion may be formed on the outer surface of the lens barrel so as to correspond to the stepped structure on the inner surface of the housing.

The protruding portion may have a second collecting groove formed in its upper surface.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
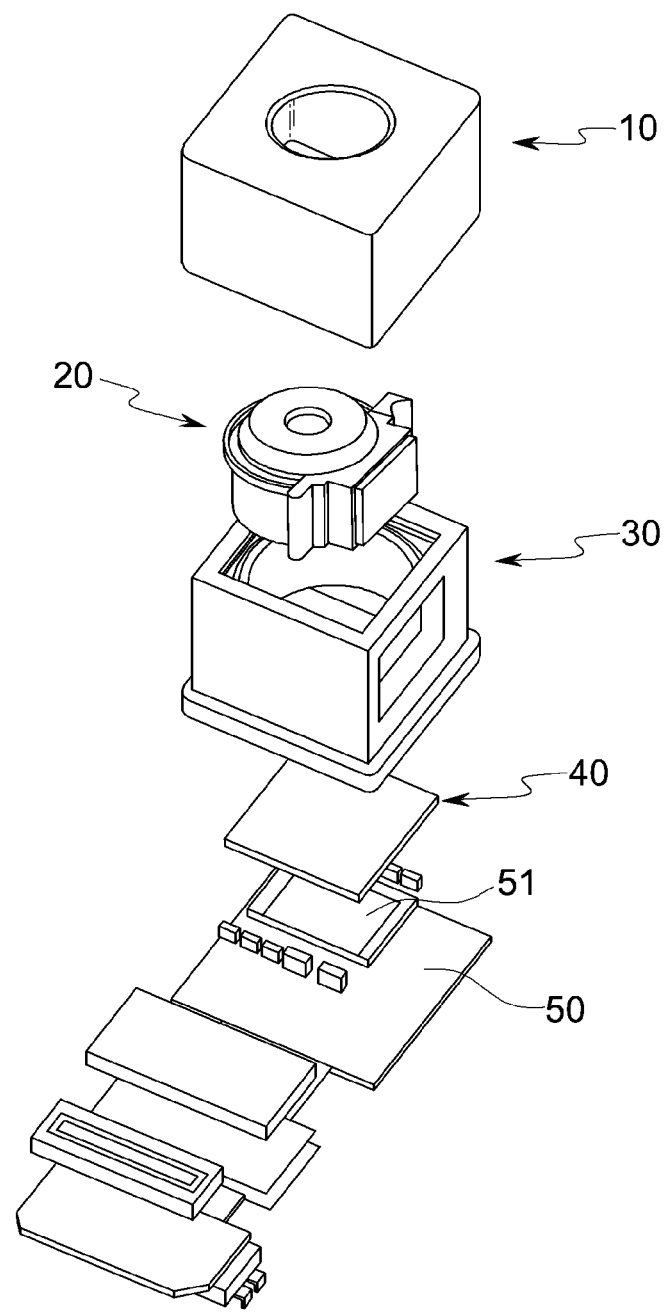
FIG. 1 is an exploded perspective view of a camera module according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

FIG. 1 is an exploded perspective view of a camera module according to an embodiment of the present invention.

Referring to FIG. 1, the camera module according to the embodiment of the present invention may include a lens barrel 20, a housing 30, a case 10, an infrared filter 40, an image sensor 51 and a printed circuit board 50.

First, with respect to the lens barrel 20, an optical axis direction refers to a vertical direction, while a direction perpendicular to the optical axis direction refers to a horizontal direction.

The lens barrel 20 may have a hollow cylindrical shape so that one or more lenses for imaging a subject may be accommodated therein. The lenses may be placed in the lens barrel 20 in the optical axis direction.

The lens barrel 20 may be coupled to the housing 30, and more specifically may be placed inside the housing 30.

Here, the lens barrel 20 may be moved in the optical axis direction for auto-focusing.

In order to move the lens barrel 20 in the optical axis direction, an actuator (not shown) including a voice coil motor may be disposed in the housing 30.

The actuator (not shown) may include a coil, a magnet and a yoke. The coil may move the lens barrel in the optical axis direction by the attractive and repulsive forces with the adjacent magnet.

The magnet generates a constant magnetic field. When the coil is powered, a driving force is generated by the electromagnetic force between the magnet and the coil, such that the lens barrel may move in the optical axis direction by the driving force.

The unit for moving the lens barrel is not limited to an actuator including a voice coil motor (VCM) but may be various types of unit, such as a mechanical driving type unit or a piezoelectric type unit using a piezoelectric device.

By moving the lens barrel 20 as described above, an auto-focusing or a zooming function may be performed.

Further, the coil may have a position sensor at its center.

The position sensor may sense the current position of the lens barrel to provide it to a control unit (not shown). The control unit (not shown) may use the information on the current position of the lens barrel 20 provided by the position sensor and information on a position to which the lens barrel 20 is to be moved, so as to control the moving of the lens barrel 20.

Since the position sensor is located at the center of the coil, separate space for locating the position sensor in the housing 30 may not be necessary, such that the actuator (not shown) may be reduced in size and manufacturing tolerances during the manufacturing process may be decreased.

The case 10 may be coupled to the housing 30 so that it covers the outer surfaces of the housing 30. The case 10 may block an electromagnetic field generated during the driving of the camera module.

Namely, electromagnetic fields are generated while the camera module is driven, and if the electromagnetic fields are emitted to the outside, other electronic components may be influenced so that communication disruptions or malfunctions may be caused by the electromagnetic fields.

Therefore, the case 10 may be coupled to the housing 30 in order to block the electromagnetic field from being emitted to the outside.

Here, the case 10 may be grounded to a ground pad (not shown) provided on the printed circuit board 50, such that the electromagnetic fields may be blocked.

The case 10 may have a through hole at its top so that light from the outside may come through the lens barrel 20, and the light coming through the through hole may be received by the image sensor 51 through the lenses.

The image sensor 51 such as CCD or CMOS may be mounted on the printed circuit board 50 by wire bonding, and the printed circuit board 50 may be coupled to the bottom of the housing 30.

An image of a subject may be collected on the image sensor 51 to be stored as data in the memory in a device, and the stored data may be displayed as video by a display medium in the device.

Here, between the lens barrel 20 and the image sensor 51, an infrared (IR) filter 40 may be disposed.

That is, the infrared filter 40 may be disposed below the lens barrel 20.

The infrared light within the light having passed through the lenses may be blocked as the light passes through the infrared filter 40, thereby preventing the infrared light from being introduced into the image sensor 51.

The infrared filter 40 may be made of a glass material, and may be manufactured by depositing various materials having different refractive indices on its surface in order to block light in the infrared region.

The infrared filter 40 may be bonded to an inner surface of the housing 30. That is, the infrared filter 40 may be bonded to the housing 30 by means of a UV curable adhesive (not shown).

Specifically, the housing 30 may have a fixing groove protruded outwardly in the horizontal direction on its inner surface, and the infrared filter 40 may be bond to the fixing groove 37.

Figure 2:
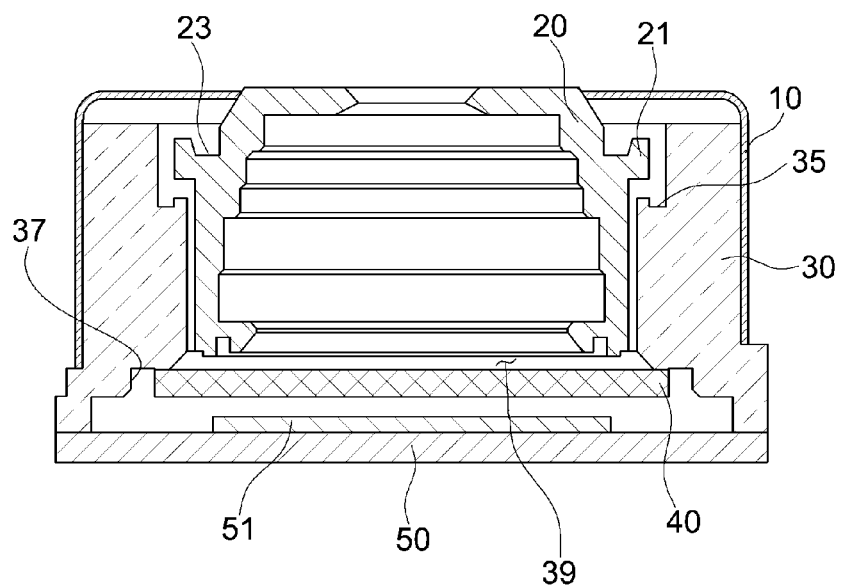
FIG. 2 is a cross-sectional view of a camera module according to an embodiment of the present invention.
Figure 3:
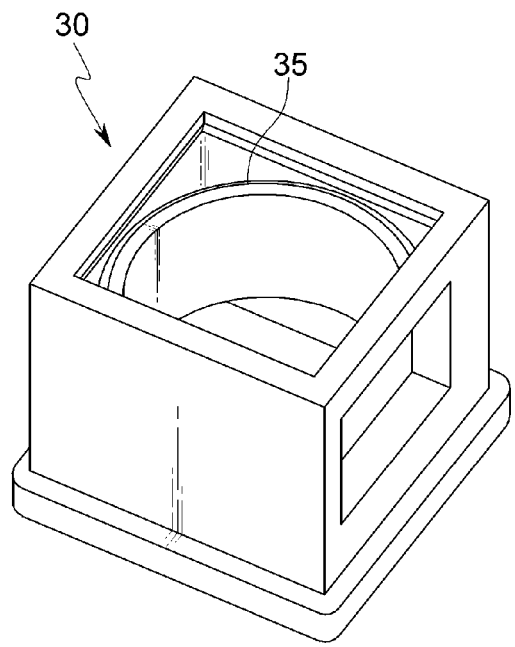
FIG. 3 is a perspective view of a housing of a camera module according to an embodiment of the present invention.

FIG. 2 is a cross-sectional view of a camera module according to an embodiment of the present invention, and FIG. 3 is a perspective view of a housing of a camera module according to an embodiment of the present invention.

Figure 4:
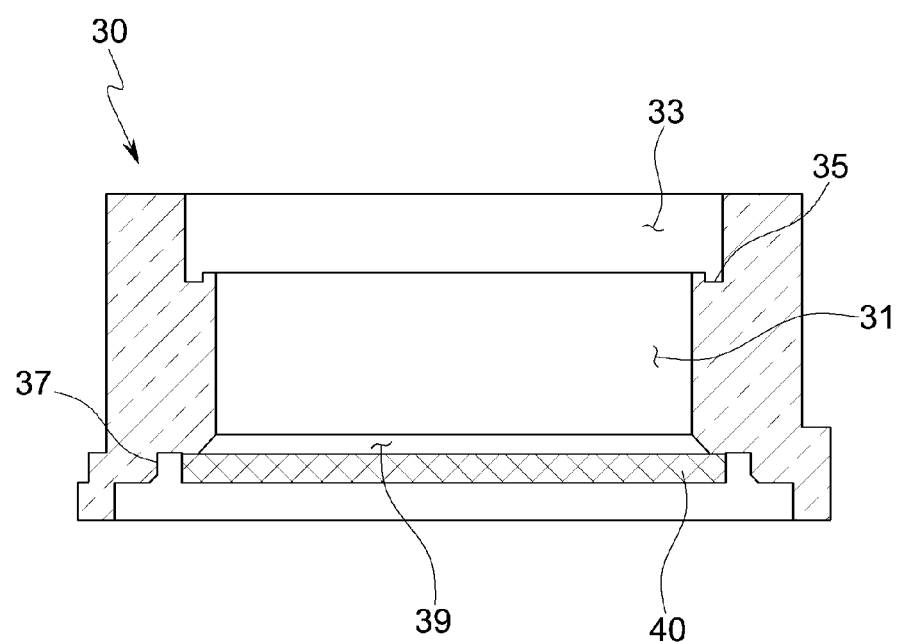
FIG. 4 is cross-sectional view of a camera module according to an embodiment in which a housing and an infrared filter are coupled to each other.
Figure 5:
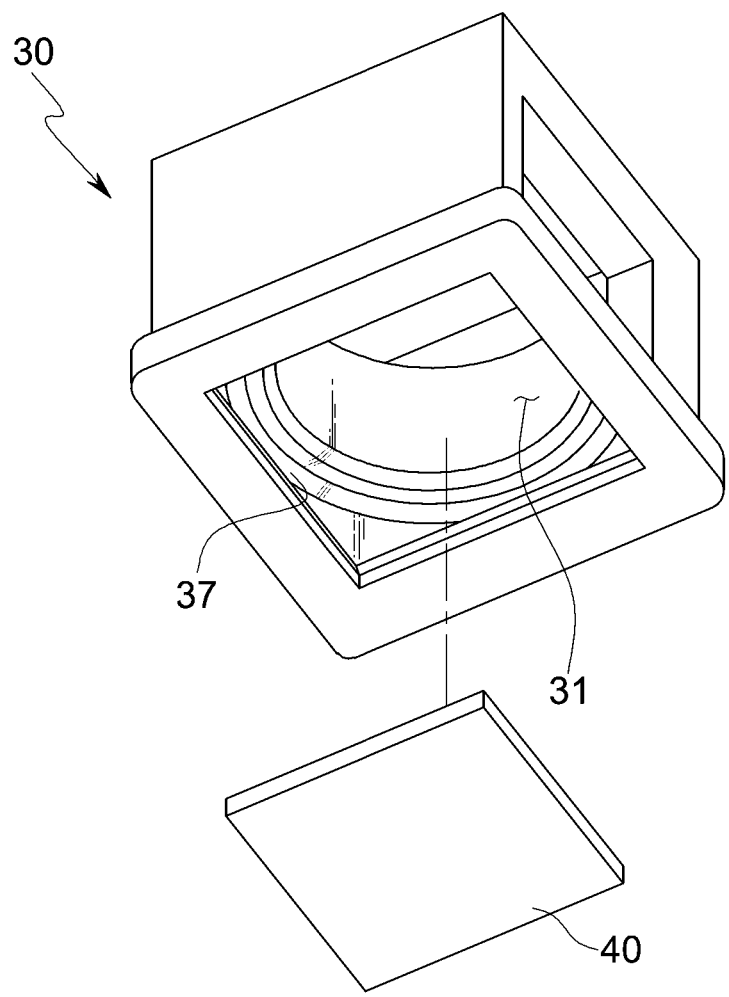
FIG. 5 is a perspective view of the housing and the infrared filter according to the embodiment, seen from the bottom.

Further, FIG. 4 is cross-sectional view of a camera module according to an embodiment in which a housing and an infrared filter are coupled to each other, and FIG. 5 is a perspective view of the housing and the infrared filter according to the embodiment, seen from the bottom.

Referring to FIGS. 2 through 5, the housing 30 included in the camera module according to an embodiment of the present invention may have the infrared filter 40 attached thereto.

The infrared filter 40 may be disposed at the lower part of the housing 30, between the lens barrel 20 and the image sensor 51.

The housing 30 may have a fixing groove 37 formed therein for fixing the infrared filter 40. That is, the fixing groove 37 may be formed on lower inner surface of the housing 30 to form a stepped structure with the inner surface on which the fixing groove 37 is not formed, such that the infrared filter 40 may be attached to the fixing groove 37.

If an inwardly protruding structure is formed on the lower inner surface of the housing 30 for attaching the infrared filter 40, the size of the camera module is increased by the size of the protruding structure.

In contrast, in the camera module according to an embodiment of the present invention, instead of forming a separate structure in the housing 30 for attaching the infrared filter 40 to the housing 30, the fixing groove 37 is formed on the lower inner surface of the housing 30.

Accordingly, in the camera module according to an embodiment of the present invention, a separate structure for attaching the infrared filter 40 is not necessary, such that the camera module can be smaller and thinner.

Incidentally, the housing 30 may have openings in the top and bottom thereof, and may have a window 39 therein through which the light from the lenses passes. That is, the space between the lens barrel 20 and the infrared filter 40 may serve as the window 39, and the window 39 may have a circular plane.

As described above, instead of forming a separate structure protruding in the housing 30 for attaching the infrared filter 40 to the housing 30, the fixing groove 37 is formed on the lower inner surface of the housing 30, such that the window 39 may have a circular plane and thus the camera module can be smaller and thinner.

Now, the inner structure of the housing 30 will be described with reference to FIGS. 3 and 4.

The housing 30 may have the lens barrel 20 inserted thereinto. That is, the housing 30 may have a hollow therein, and its upper inner diameter may be greater than its lower inner diameter.

Specifically, the housing 30 may have a first through hole 31 in which the lens barrel 20 is inserted, and a second through hole 33 having a greater diameter than that of the first through hole 31.

The first and second through holes 31 and 33 may be connected to each other with a step difference. That is, the inner surface of the housing 30 may be stepped.

Further, on the stepped portion, a first collecting groove 35 may be formed which extends along the inner surface of the housing.

Further, although not shown in the drawings, an adhesive material may be applied on the inner surface of the housing 30.

If foreign objects are introduced into a camera module to enter an image sensor, it may cause adverse influences such as image deterioration or flaring.

In the camera module according to the embodiment of the present invention, however, by forming the upper inner diameter of the housing 30 greater than the lower inner diameter of the housing 30 so as to form a stepped structure, even if foreign objects have been introduced into the camera module according to the embodiment, it may be collected by the stepped structure.

Moreover, by forming the first collecting groove 35 on the stepped portion, foreign objects are collected in the first collecting groove 35 so as not to be introduced in the image sensor 51.

Further, even if foreign objects are introduced into the camera module, they stick to the adhesive material applied on the inner surface of the housing 30, thereby preventing the foreign objects from reaching the image sensor.

Figure 6:
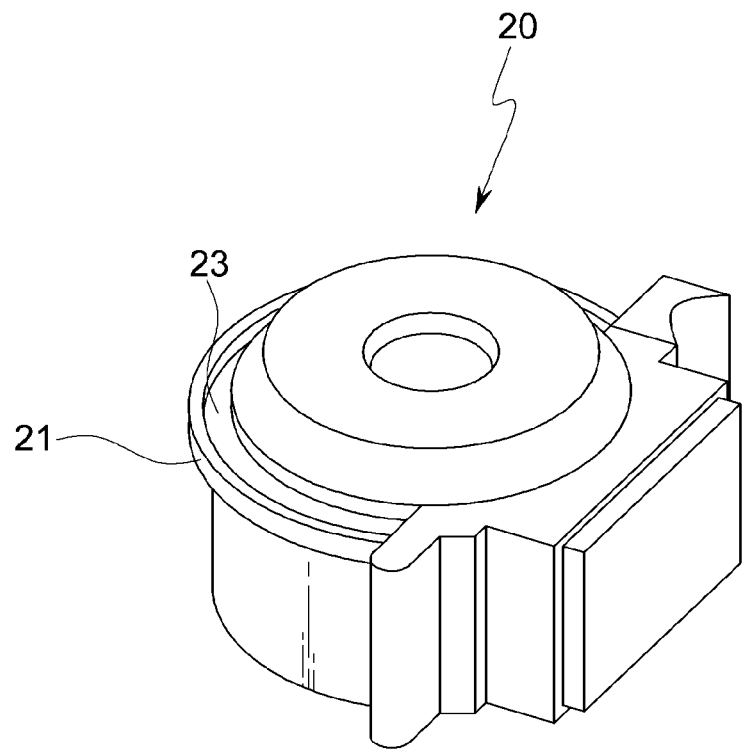
FIG. 6 is a perspective view of a lens barrel of a camera module according to an embodiment of the present invention.
Figure 7:
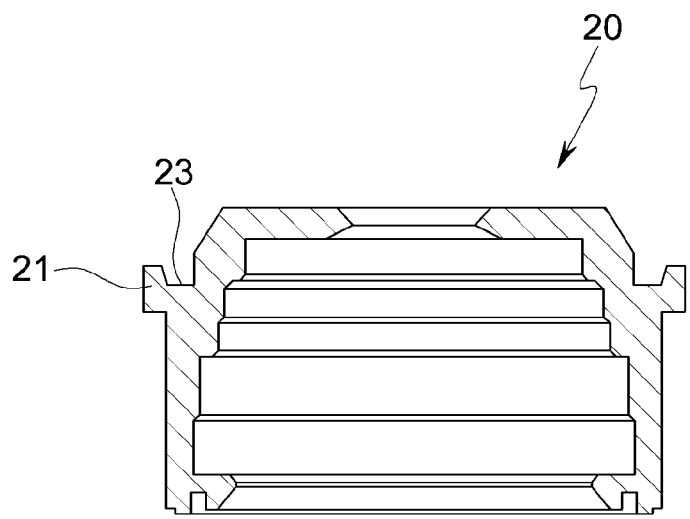
FIG. 7 is a cross-sectional view of the lens barrel of the camera module according to the embodiment of the present invention.

FIG. 6 is a perspective view of a lens barrel of a camera module according to an embodiment of the present invention, and FIG. 7 is a cross-sectional view of the lens barrel of the camera module according to the embodiment of the present invention.

Referring to FIGS. 6 and 7, the structure of the lens barrel 20 provided in the camera module according to the embodiment of the present invention.

The lens barrel 20 may have a hollow cylindrical shape so that one or more lenses for imaging a subject may be accommodated therein. The lenses may be placed in the lens barrel 20 in the optical axis direction.

The lens barrel 20 may be provided in the housing 30.

The housing 30 may have first and second through holes 31 and 33 so that the lens barrel 20 is inserted thereinto. The second through hole 33 has a diameter greater than that of the first through hole 31. The first and second through holes 31 and 33 may be connected to each other with a step difference.

That is, the inner surface of the housing 30 may be stepped, and a protruding portion 21 may be formed on the outer surface of the lens barrel 20 so as to correspond to the stepped portion on the inner surface of the housing 30.

The protruding portion 21 may face the inner surface of the housing 30.

Specifically, the protruding portion 21 may face a part of the inner surface of the housing 30, in which the second through hole 33 is formed.

Accordingly, the diameter of the lens barrel 20 where the protruding portion 21 is formed may be greater than that of the first through hole 31 and smaller than that of the second through hole 33.

Since the protruding portion 21 protrudes from the outer surface of the lens barrel 20, the outer surface of the lens barrel 20 where the protruding portion 21 is formed may have a step difference.

That is, at least two stepped structure may be formed between the inner surface of the housing 30 and the outer surface of the lens barrel 20.

In addition, a second collecting groove 23 may be formed on the upper surface of the protruding portion 21, which is impressed downwardly in the optical axis direction. The second collecting groove 23 may extend along the upper surface of the protruding portion 21.

Further, although not shown in the drawings, an adhesive material may be applied on the outer surface of the lens barrel 20.

In the camera module according to the embodiment of the present invention, by forming the protruding portion 21 protruding from the outer surface of the lens barrel 20 so as to form the outer surface of the lens barrel 20 with a step difference, even if foreign objects have been introduced into the camera module according to the embodiment, it may be collected by the stepped structure.

Moreover, by forming the second collecting groove 23 on the protruding portion 21, foreign objects are collected in the second collecting groove 23 so as not to be introduced in the image sensor 51.

Further, even if foreign objects are introduced into the camera module, they stick to the adhesive material applied on the inner surface of the housing 30, thereby preventing the foreign objects from reaching the image sensor.

In conclusion, in the camera module according to the embodiment, by forming at least two stepped structures between the inner surface of the housing 30 and the outer surface of the lens barrel 20, even if foreign objects are introduced into the camera module, they are prevented from reaching the image sensor 51.

Each of the stepped structures may have the first and second collecting grooves 35 and 23, respectively, to collect foreign objects. Further, by applying an adhesive material onto at least one of the inner surface of the housing 30 and the outer surface of the lens barrel 20, it may be possible to effectively prevent foreign objects from being introduced into the image sensor.

As set forth above, according to embodiments of the present invention, even if foreign objects have been introduced into a camera module, it may be possible to prevent introduced foreign objects from reaching an image sensor.

While the present invention has been shown and described in connection with the embodiments, it will be apparent to those skilled in the art that modifications and variations can be made without departing from the spirit and scope of the invention as defined by the appended claims.

What is claimed is:

1. A camera module comprising:
a lens barrel having one or more lenses positioned along an optical axis; and
a housing having the lens barrel therein, wherein the housing includes a first through hole into which the lens barrel is inserted and a second through hole having a diameter larger than that of the first through hole, wherein the lens barrel has, on its outer surface, a protruding portion facing the inner surface of the housing in which the second through hole is formed, and wherein the protruding portion has a first collecting groove formed in its upper surface.

2. The camera module of claim 1, wherein the first through hole and the second through hole are connected to each other by a stepped portion, wherein a second collecting groove is formed in the stepped portion.

3. The camera module of claim 1, wherein the housing has a fixing groove in its lower inner surface, wherein the fixing groove has an infrared filter attached thereto.

4. The camera module of claim 3, wherein a window is formed between the lens barrel and the infrared filter through which light from the lenses passes, wherein the window has a circular plane.

5. The camera module of claim 1, wherein a diameter of the protruding portion is greater than that of the first through hole and smaller than that of the second through hole.

6. A camera module comprising:

a lens barrel having one or more lenses positioned along an optical axis; and a housing having the lens barrel therein, wherein at least two step structures are formed between an inner surface of the housing and an outer surface of the lens barrel, wherein a protruding portion is formed on the outer surface of the lens barrel so as to correspond to any one of the at least two step structures, and wherein the protruding portion has a first collecting groove formed in its upper surface.

7. The camera module of claim 6, wherein the inner surface of the housing is stepped, wherein the stepped portion has a second collecting groove formed therein.

* * * * *